Nov. 17, 1959   J. L. AASLAND   2,912,812
CORN PICKING ATTACHMENT FOR COMBINES
Filed July 9, 1957   4 Sheets-Sheet 1

INVENTOR.
John L. Aasland
Paul O. Pippel
Attorney

Nov. 17, 1959    J. L. AASLAND    2,912,812
CORN PICKING ATTACHMENT FOR COMBINES
Filed July 9, 1957    4 Sheets-Sheet 2
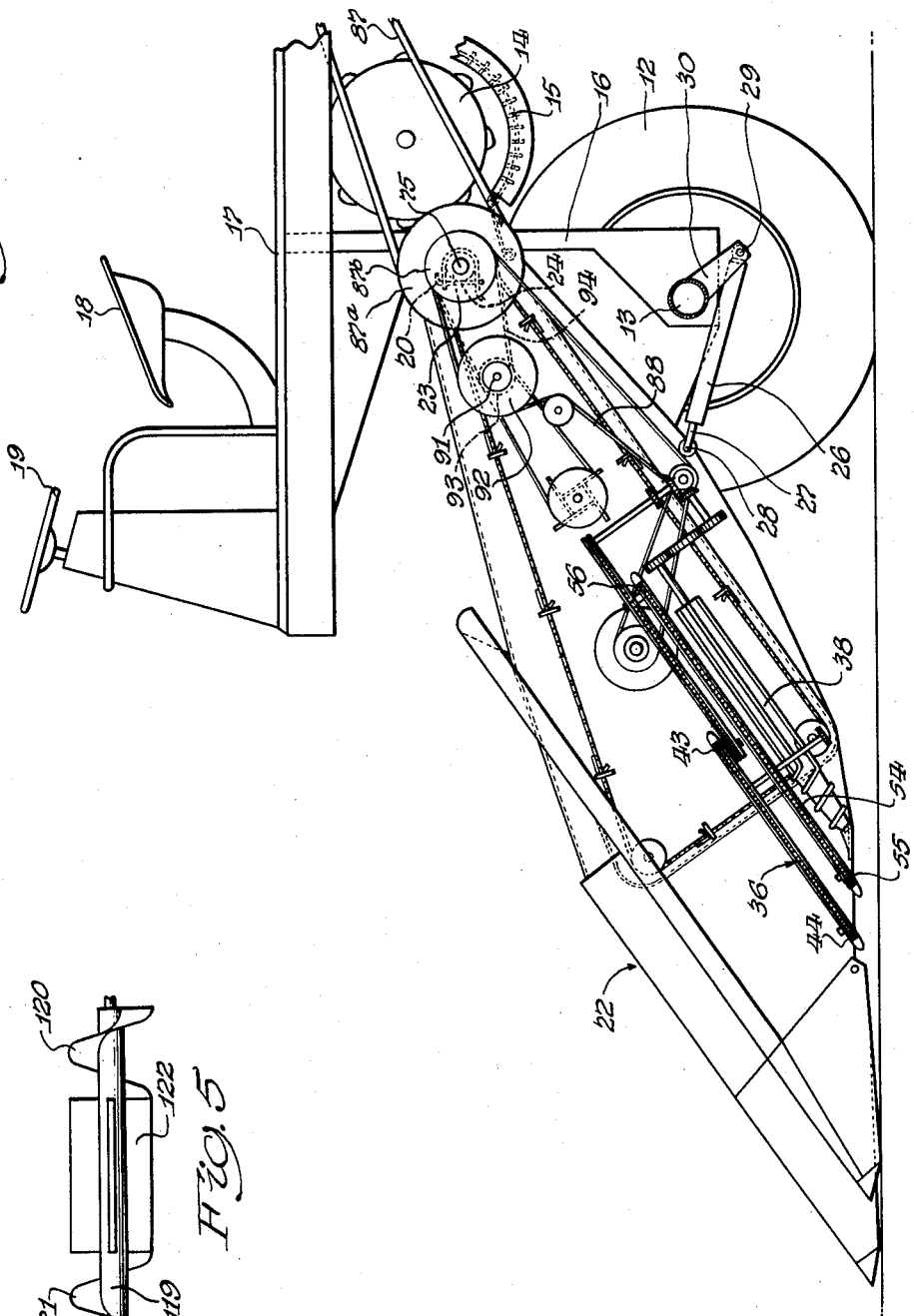
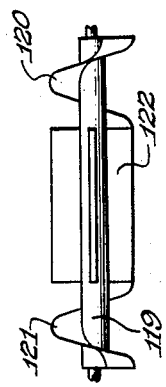
INVENTOR.
John L. Aasland
Paul O. Pippel
Attorney Nov. 17, 1959     J. L. AASLAND     2,912,812
CORN PICKING ATTACHMENT FOR COMBINES
Filed July 9, 1957     4 Sheets-Sheet 3
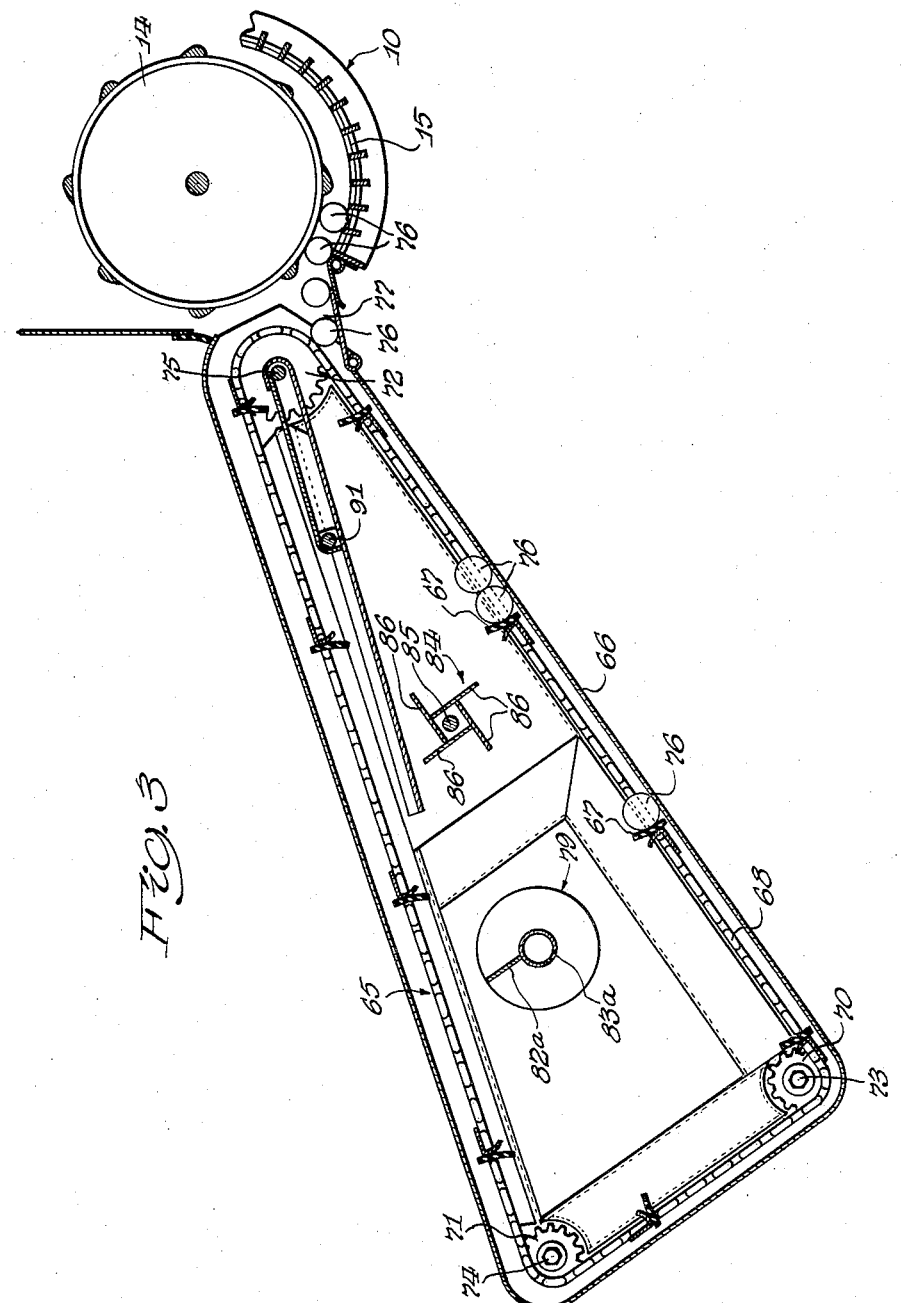
INVENTOR.
John L. Aasland
Paul O. Pippel
Attorney

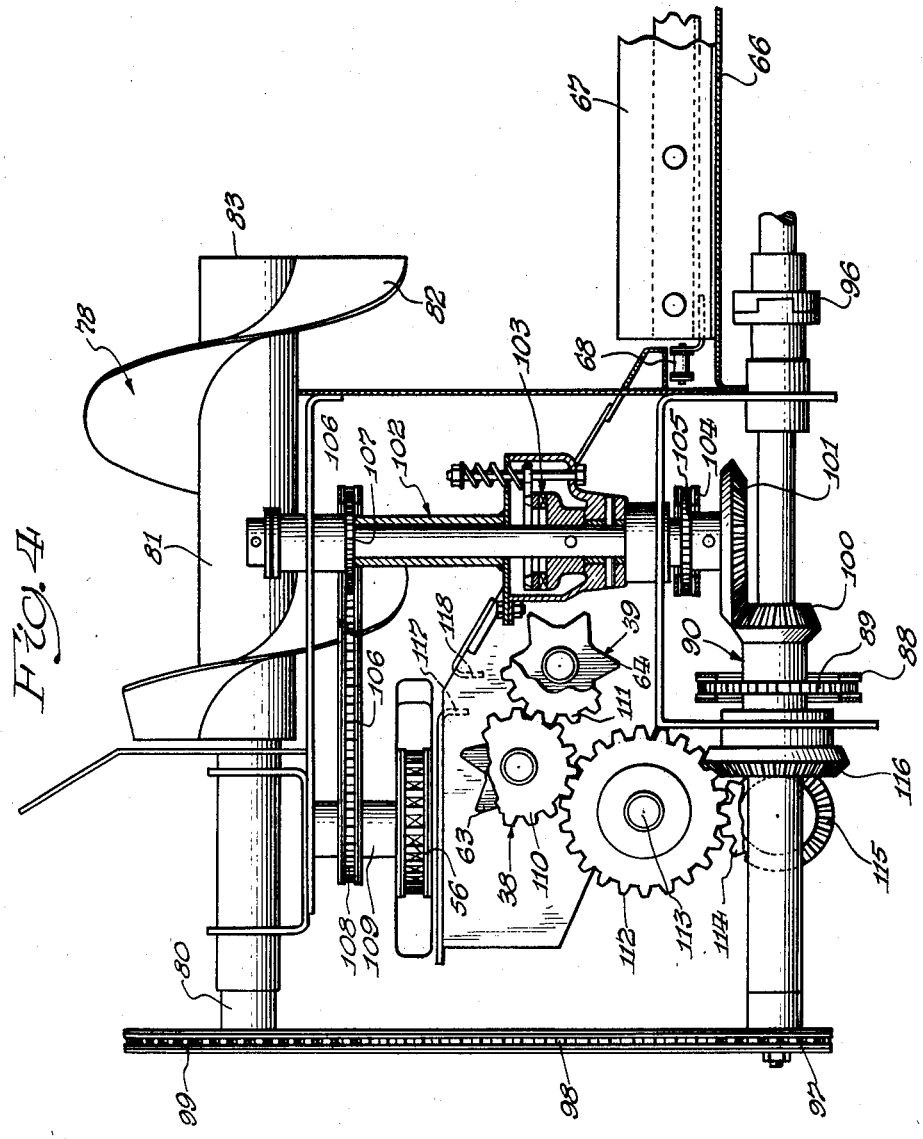

United States Patent Office 2,912,812
Patented Nov. 17, 1959

2,912,812

CORN PICKING ATTACHMENT FOR COMBINES

John L. Aasland, Moline, Ill., assignor to International Harvester Company, Chicago, Ill., a corporation of New Jersey Application July 9, 1957, Serial No. 670,696

1 Claim. (Cl. 56—18)

This invention relates to a new and improved corn picking attachment for combines.

Combines are the name given to combination machines having harvester and thresher parts. Combines are generally used to harvest and then subsequently thresh small grains. Such machines are relatively standard among all of the farm equipment manufacturers. In the past it has generally been accepted that the harvesting of corn, which is considered a larger grain, would have to be accomplished by a separate machine. However, some years ago it was discovered that the threshing portions of the small grain combine would effectively operate to shell corn from their cobs and thereafter clean the shelled corn in the same manner as the device would operate with the generally accepted small grains such as wheat, oats, rye and barley. Thus, all that is necessary to utilize the combine as a corn harvesting machine is to substitute one harvesting unit for another.

It is therefore a principal object of this invention to provide a harvesting attachment for corn to be applied to a combine in such a manner that the ears of corn are stripped from the corn stalks and thereupon fed into a conventional combine where the kernels are shelled from the cobs by the threshing cylinder and thereafter the corn is processed to make it clean for eventual storage and/or use.

An important object of this invention is to supply a harvesting unit for corn in which there is employed snapping rolls which rotate inwardly toward one another and downwardly to cause a snapping of the ears from the stalks either directly or by means of stripper plates thereabove which cause the ears to be stripped from the stalks as the cooperative rolls aggressively pull the stalks downwardly therebetween.

Another and further important object of this invention is the provision of means in a corn harvester for dropping snapped ears of corn into a relatively wide conveyor which is generally disposed between spaced apart cooperative snapping rolls and is equipped with cross flights which transport the ears rearwardly and upwardly and pitch them with a certain amount of speed into the threshing elements of an ordinary small grain combine.

Another and further important object of this invention is to provide a corn harvester attachment for combines in which there is included pairs of spaced apart cooperative snapping roll units and having an intermediately disposed upwardly and rearwardly inclined floor therebetween, and a dragging conveyor mechanism arranged and constructed to carry or slide ears of corn upwardly on the inclined floor for deposit into a cooperative threshing cylinder and concave which forms a part of a regular combine.

Still another important object of this invention is the provision of opposed inwardly feeding open end augers which are placed crosswise at the end of the pairs of cooperative snapping rolls to positively move snapped ears of corn into the wide elevating conveyor disposed between the snapping rolls.

A further important object of this invention is to provide a cross feeder for ears of corn which insures delivery of such ears into a feeder conveyor.

Still another object is to employ a combination auger and beater as a cross feeder.

Other and further important objects and advantages will become apparent from the disclosures in the following specification and accompanying drawings.

In the drawings:

Figure 2 is a side elevational view of the device as shown in Figure 1;

Figure 3 is an enlarged sectional view taken on the line 3—3 of Figure 1;

Figure 4 is a detailed sectional view of the device as taken on the line 4—4 of Figure 1;

Figure 5 is a detail view of an optional form of cross feeding device.

Figure 1:
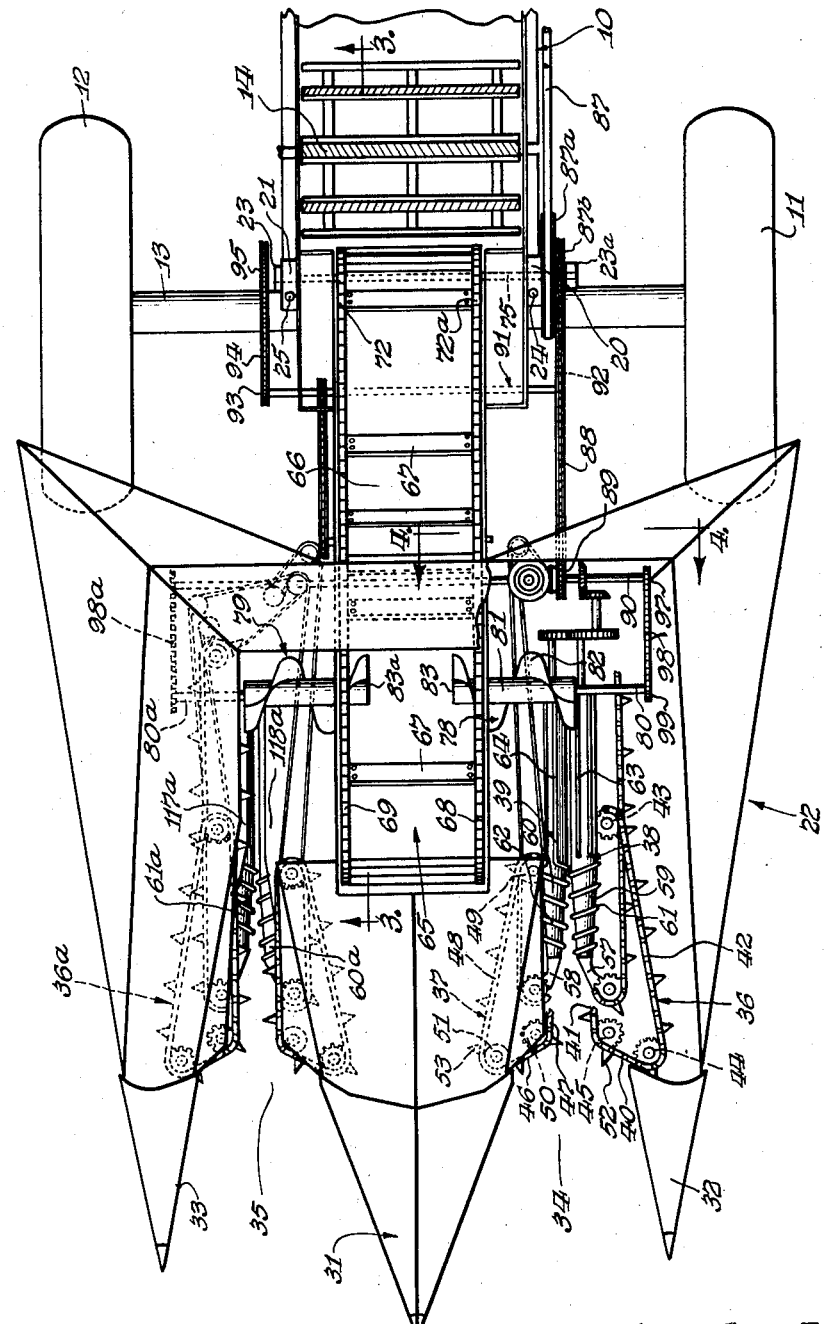
Figure 1 is a top plan view with parts broken away of the corn harvesting machine of this invention.

As shown in the drawings, the reference numeral 10 indicates generally the grain threshing and separating portion of a combine. The separator portion 10 is carried on generally widely spaced apart traction wheels 11 and 12 which are in turn mounted on an axle 13. The threshing portion of the machine includes a threshing cylinder 14 and a cooperative concave 15 between which the grain is separated from its hull or in the case of corn the separation of the kernels from the ear. A vertically disposed supporting structure 16 is carried on the axle 13 and projects upwardly for supporting a deck 17 which may be construed to be an operator's station. The station deck 17 includes an operator's seat 18, a vehicle steering wheel 19 and various other controls for the implement which have not been shown in detail herein because they form no part of the present invention.

The forward portion of the threshing and separating housing 10 is provided with forwardly opening sockets 20 and 21 spaced apart and flanking the lateral or side extensions of the cooperative threshing cylinder 14 and the concave 15. The spaced sockets 20 and 21 are adapted to receive and hold the corn harvesting unit 22 of this invention. The upper rearward end of the corn harvesting unit 22 is provided with tubular hub-like members 23 and 23a at each side thereof which act to cooperate with and rest within the aligned spaced apart forwardly opening sockets 20 and 21 on the threshing portion. The corn harvesting unit thus constitutes an integral machine with the thresher. Vertically disposed pins 24 and 25 are arranged to pass through the socket members 20 and 21 at a position forwardly of the tubular members 23 to thereupon hold the harvesting unit relative to the threshing unit 10.

As best shown in Figure 1 the harvesting unit is held against separation from the threshing unit 10 although it is capable of vertical swinging movement about the tubular members 23 and 23a on a horizontal axis. The vertical swinging adjustment of the corn harvesting unit 22 is accomplished by a fluid operated cylinder 26 and an extending and retracting piston rod 27. The rod 27 is hingedly fastened at 28 to the underside of the corn picking unit 22 substantially midway between the forward end thereof and its hinged mounting on the tubular members 23 and 23a. The outer end of the fluid cylinder 26 is hingedly mounted at 29 on an arm 30 depending rearwardly and downwardly in a fixed position from the wheel shaft or axle 13. Thus when the piston rod 27 is extended from the cylinder 26 the harvesting unit 22 will be swung upwardly about the tubular members 23 and 23a as a pivot to thereupon harvest the grain or corn at any desired level. In other words if it is desired to pick corn that is relatively down, the picking unit will be lowered to the position shown in Figure 2 whereas if it is desired to harvest corn from a position higher up on the stalks then the picking unit is raised and not nearly so much material is required to pass through the machine.

As best shown in Figure 1 the corn harvesting unit 22 is provided with a center divider 31 and laterally spaced apart side divider members 32 and 33. The space between the center divider 31 and the side divider 32 constitutes one corn picking row and similarly the space between the center divider 31 and the side divider 33 constitutes the space for the second and spaced apart corn picking row. The device of this invention is thus a two row harvesting unit for two rows of corn. A V-shaped opening 34 defines the chamber or entrance to the first picking unit between the dividers 31 and 32 and similarly a V-shaped opening 35 defines the entrance to the spaced apart picking unit between the dividers 31 and 33. Stalk gathering chains 36 and 37 are disposed on the harvesting unit adjacent the inner ends of the V-shaped mouth or stalk entrance 34 and cooperate to pull or feed stalks rearwardly through the picking unit and into the grasp of cooperative snapping or feed rolls 38 and 39. Let us examine the gathering chain 36. This chain includes an outwardly flaring front flight 40 and a rearwardly extending flight 41 disposed above the corn stalk feeding rolls 38 and 39. A return flight 42 completes the triangularly shaped gathering chain 36. The shape of this chain extension is maintained by spaced apart sprockets 43, 44 and 45. Similarly the gathering chain 37 has a forwardly disposed flight 46, a rearwardly disposed flight 47 and a return flight 48. Here again the chain is held in its extended triangular shape by means of its sprockets 49, 50 and 51. Both of the gathering chains 36 and 37 are provided with regularly spaced apart pointed fingers 52 and 53 which cooperate with the stalks to cause feeding of the stalks rearwardly through the picker unit. In other words these sharp inwardly projecting fingers 52 and 53 cooperate to aggressively feed the stalks rearwardly in the machine by penetrating the stalks. Thus as the rearwardly extending flights 41 and 47 of the gathering chains 36 and 37 move rearwardly the stalks of corn also move rearwardly and are fed to the forward juncture between the feed and snapping rolls 38 and 39. An auxiliary gathering chain is shown at 54 and is held extended between spaced apart sprockets 55 and 56. The sprocket 55 is located just rearwardly of the sprocket 45 and the gathering chain proceeds rearwardly to the sprocket 56 which is positioned rearwardly of the snapping rolls 38 and 39.

The forward end of the snapping rolls 38 and 39 are journalled in supporting brackets 57 and 58 which flank the sides of the corn stalk passage as defined by the gathering chains 36 and 37 and more particularly their rearwardly running adjacent flights 41 and 47. Further the forward ends of the snapping rolls 38 and 39 are tapered as shown at 59 and 60. The tapered forward ends are provided with spiral ribs 61 and 62 which cooperate to guide and feed the stalks passing therebetween rearwardly into the fluted rearward portions 63 and 64 of the rolls 38 and 39. These flutes or longitudinally extending ribs 63 and 64 are disposed around the circumference of each of the rolls 38 and 39 and are adapted to positively and aggressively pull the stalks downwardly therebetween and thus effect a snapping of any ears of corn on the stalk by means of spaced apart stripper plates 117 and 118. The rolls 38 and 39 and their associated stripper plates 117 and 118 are arranged on an incline so that the ears will fall inwardly toward the center of the harvesting unit. It should be understood that the picking unit on the other side of the harvester and in line with the V-shaped mouth 35 is identical to that described for 34 and hence the details will not be again recited. For purposes of convenience similar reference characters will be applied to the elements on the other side of the machine with the suffix "a" thereafter.

When the ears are snapped by the snapping rolls 38 and 39 and 38a and 39a, the ears are adapted to fall centrally between the spaced apart snapping rolls and be received by a relatively wide feeder conveyor 65. The wide conveyor 65 includes a generally upwardly and rearwardly inclined floor 66 which may be termed a feeder conveyor inasmuch as it is employed for the purpose of feeding harvested material to the threshing and separating housing 10. As the ears of corn are dropped inwardly to the center inclined floor 66, they are picked up and swept rearwardly on this inclined floor by spaced apart cross flights 67 which are attached to spaced apart chains 68 and 69. The chain 68 and 69 are identical and lie parallel one to the other and extend from a position just rearwardly of the center divider 31 and terminate closely adjacent the entrance to the thresher housing 10 at the opening of the threshing cylinder 14 at its cooperative concave 15. The sectional detail of this conveyor 65, as shown in Figure 3, clearly depicts the operation thereof. The extended chains 68 and 69 are generally triangular in shape and, as shown for the chain 68, it is held in this position by spaced sprockets 70, 71 and 72. Each of these sprockets is mounted on transversely disposed stub shafts 73 and 74 at each side thereof and a cross shaft 75 at the top of the unit. It should be understood that corresponding sprockets on similar stub shafts are employed to maintain the chain 69 uniformly extended. Figure 3 also clearly shows how the paddles or cross flights 67 cooperate with the floor 66 to elevate ears as shown at 76 upwardly and rearwardly for sweeping with a certain amount of force or speed into the passage 77 which forms the mouth between the threshing cylinder 14 and its cooperative concave 15. For purposes of pictorially illustrating the travel of the ears of corn 76, a number of them have been shown passing over the mouth or feeder section 77 and into the space between the threshing cylinder and concave. It is obvious that the width of the conveyor 65 which is greater than the length of the ears of corn being harvested causes the ears to lie parallel to the cross flights 67 and thus insure a forced entrance into the threshing cylinder concave in this same parallel position so that there is less apt to cause a breaking of the cobs as the kernels of corn are threshed or stripped therefrom.

In order to prevent ears of corn from travelling up beyond the ends of the cooperative pairs of snapping rolls, or hesitate at this point there is provided transversely disposed augers 78 and 79. These auger conveyors are in alignment with one another and opposite so that they feed ears of corn from the snapping rolls inwardly to a position between the spaced apart conveyor chains 68 and 69 and drop the ears onto the floor 66 whereupon the cross slats or bars 67 pick the ears up and sweep them upwardly and rearwardly over the inclined floor 66 to the threshing mechanism as previously described. The auger 78 is mounted on a shaft 80 and includes a core 81 and spiral flight 82. The inner end of the auger 78 is shown in open and unjournalled, as shown at 83, whereupon ears of corn may be fed therethrough without interference. The construction of the opposing auger conveyor 79 is identical to that of the auger 78 and as previously stated the reference numerals applied to the auger 79 will be the same as those for the auger 78 with the suffix "a" thereon. The relative position of the auger conveyors 78 and 79 with respect to the conveyor 65 is shown in Figure 3 wherein the augers are substantially above the lower flight of the chain type conveyor 65 and thus the ears delivered thereby may be dropped centrally between the spaced chains 68 and 69 forming the conveyor 65. The opposing augers have been shown as separate elements. However, it is contemplated a single core or shaft 119 as shown in Figure 5 may span the spaced picker units and have opposing flight thereon 120 and 121. The flights are arranged to deliver snapped ears of corn centrally therebetween into a paddle member 122 also mounted on the common core 119. The paddle 122 gives added impetus to the movement of the harvested ears of corn rearwardly into the thresher elements.

The beater member 84 is mounted on a shaft 85 and includes generally radially extending paddle members 86. This beater is positioned between the upper and lower flights of the wide conveyor 65 and is for the purpose of breaking down bushy trash and to promote more effective feeding of the ears upwardly and rearwardly without interference from stalks or trash or the like.

A belt 87 acts as the driving means for the harvester unit elements and delivers its rotational drive to a pulley 87a mounted on a hub 23a which is free to rotate on shaft 75. Also mounted on the hub 23a is a sprocket 87b which carries a chain 88 for redelivering the rotational drive downwardly and forwardly to a sprocket 89 on a shaft 90.

A jack shaft 91 has a sprocket on one end thereof, as shown at 92, which is in engagement with the chain 88. The jack shaft 91 carries the drive across the unit to the other side thereof where a smaller sprocket 83 on the other end carries a chain 94 for driving a sprocket 95 on the shaft 75 which as previously stated carries the sprockets 72 and 72a for driving of the feeder conveyor 65. It should be apparent that the sizes of the sprockets 92 and 93 cause a reduced speed of the conveyor 65. Drive from one unit is transferred to the other unit through a coupling 96 on the jack shaft 90. As best shown in Figure 4, a sprocket 97 is mounted on the outer end of the shaft 90 and imparts drive to a chain 98. The chain 98 extends upwardly and is mounted on a relatively large sprocket 99 which, in turn, is mounted on the shaft 80 for driving the open end auger 78.

A bevel gear 100 is mounted on the shaft 90 and imparts rotational drive to the bevel gear 101 which lies at right angles to the gear 100. The bevel gear 101 is mounted on a generally vertically disposed shaft structure 102 and is employed to deliver drive to the gathering chains. A dual purpose slip clutch 103 is adapted to protect the inner gatherer drive chain 104 which is carried on a sprocket 105, in turn, mounted on the vertical shaft structure 102. The outer gatherer chain 106 is mounted on a sprocket 107 also carried on the vertical shaft structure 102 and receives protection from this dual purpose slip clutch 103. The chain 106 extends across the machine to a sprocket 108 on a vertical shaft 109 which carries the sprocket 56 for the upper end of the gathering chain 54.

The upper ends of the snapping rolls 38 and 39 are provided with inter-engaging spur teeth 110, and 111, respectively. The spur gear 110 is in meshing engagement with a spur gear 112 which is mounted on a shaft 113 and further is in engagement with a spur gear 114 which has adjacent thereto a bevel gear 115 in engagement with a bevel gear 116 carried on the jack shaft 90. Thus, the snapping rolls 38 and 39 receive their rotational drive from the common driving V-belt 84 through the series of driving elements as just described.

In operation, the machine of this invention is adapted to pass through a field of standing corn to be harvested whereupon the machine is capable of picking two rolls simultaneously when the mouth portions 34 and 35 thereof are directed towards adjacent rolls of corn. The stalks are thereafter fed inwardly and rearwardly by the gathering chains 36 and 37 for entry into the cooperative snapping rolls 38 and 39. The flutes 63 and 64 on the snapping rolls cause a positive downward pulling of the stalks therethrough to result in a stripping of the ears on the stalks by means of the stripper plates 117 and 118. The stalks fall by gravity into the center of the machine occupied by the relatively wide feeder conveyor 65. The positioning of the snapping rolls 38 and 39 one with the other is clearly shown in the sectional view of Figure 4 whereupon the ears fall naturally into the center thereof for engagement by the cross slats 67 of the conveyor 65. In the event the ears are not immediately fed into the proximity of the conveyor 65, the open ended augers 78 and 79 will positively feed the ears of corn across into the space between the conveyor chains 68 and 69 whereupon the cross slats 67 may sweep the ears upwardly in a parallel fashion as shown in Figure 3 and depicted by the numeral 76. The beater 84 breaks down the bushy trash which may accompany the ears of corn to the center feeder conveyor 65 and thus insures a continuous uninterrupted feeding of the ears of corn to the threshing mechanism. The threshing elements contain a cylinder 14 and a cooperative concave 15 and all of the subsequent cleaning mechanisms which have not been shown in detail inasmuch as they form no part of the present invention.

It is, however, believed that the picking of two or more rows of corn, or for that matter one row of corn and depositing the snapped ears into a feeder conveyor such as that shown at 65 for upward and rearward feeding of the ears in a parallel manner is novel and it should be apparent that numerous details of construction may be varied throughout a wide range without departing from the principles disclosed herein and we therefore do not propose limiting the patent granted hereon otherwise than as necessitated by the appended claim.

What is claimed is:

A corn harvesting attachment for combines comprising a pair of spaced apart cooperative longitudinally disposed snapping rolls arranged and constructed to harvest two adjacent rows of corn, a single relatively wide feeder conveyor disposed substantially parallel to and between said pair of spaced apart cooperative snapping rolls, said feeder conveyor generally wider than the length of the ears of corn carried thereby, each of said pair of cooperative snapping rolls having the outer roll thereof disposed higher than the inner roll thereof whereby snapped ears of corn from both cooperative snapping rolls will fall by gravity toward the center of the harvesting attachment into said single wide feeder conveyor, and said feeder conveyor adapted to feed snapped ears of corn rearwardly into a thresher portion of said combine, said single relatively wide feeder conveyor comprising spaced apart endless chains, cross slats between said chains, said endless chains extended in a generally triangular shape forming lower and upper flights and an adjoining front flight, an upwardly and rearwardly inclined floor space, said lower flight of said endless chains and cross slats adapted to ride on said inclined floor surface and carry ears of corn upwardly and rearwardly therein, and said ears of corn falling from said snapping rolls directly on said inclined floor surface between said upper and lower flights and rearwardly of said front flight of said feeder conveyor, and inwardly extending auger conveyors arranged and constructed transversely to said longitudinally extending snapping rolls and projecting into a position between the upper and lower flight of said feeder conveyor to aid in the feed of ears of corn from the snapping rolls to a position within the relatively wide feeder conveyor between the upper and lower flights of said feeder conveyor.

References Cited in the file of this patent

UNITED STATES PATENTS

| | | |
|---|---|---|
| 1,821,985 | Peterson | Sept. 8, 1931 |
| 1,906,692 | Lindgren et al. | May 2, 1933 |
| 2,331,520 | Urschel | Oct. 12, 1943 |
| 2,606,647 | Andersen et al. | Aug. 12, 1952 |
| 2,669,824 | Dwyer | Feb. 23, 1954 |
| 2,787,106 | Bish | Apr. 2, 1957 |
| 2,794,307 | Morrison et al. | June 4, 1957 |